May 14, 1963
A. C. ALLEN ETAL
3,089,501
SPEED GOVERNING SYSTEMS
Filed Oct. 18, 1957
3 Sheets-Sheet 1
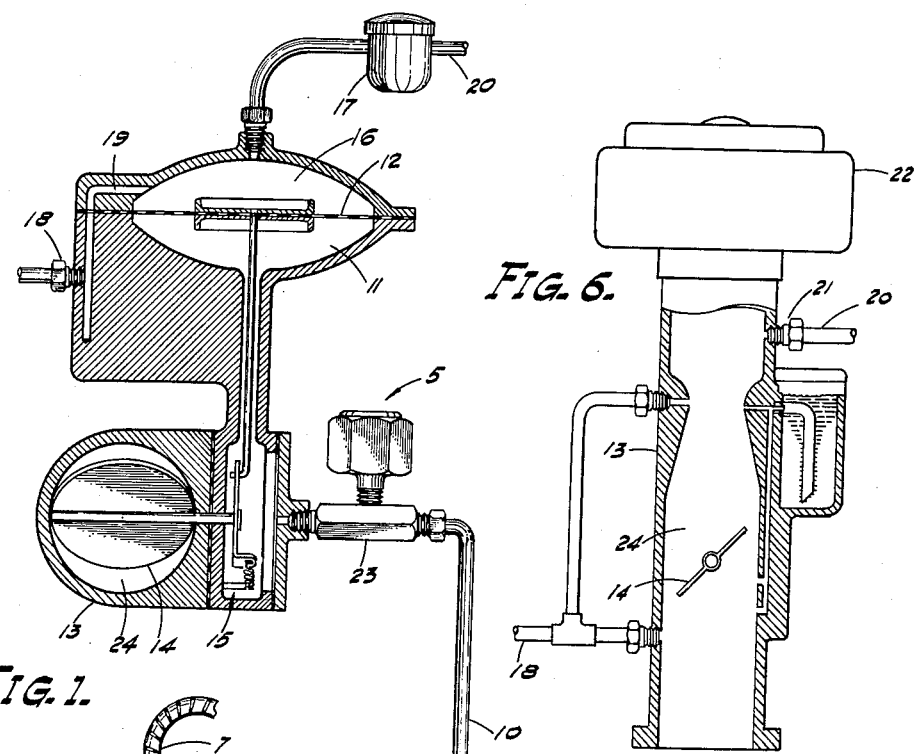
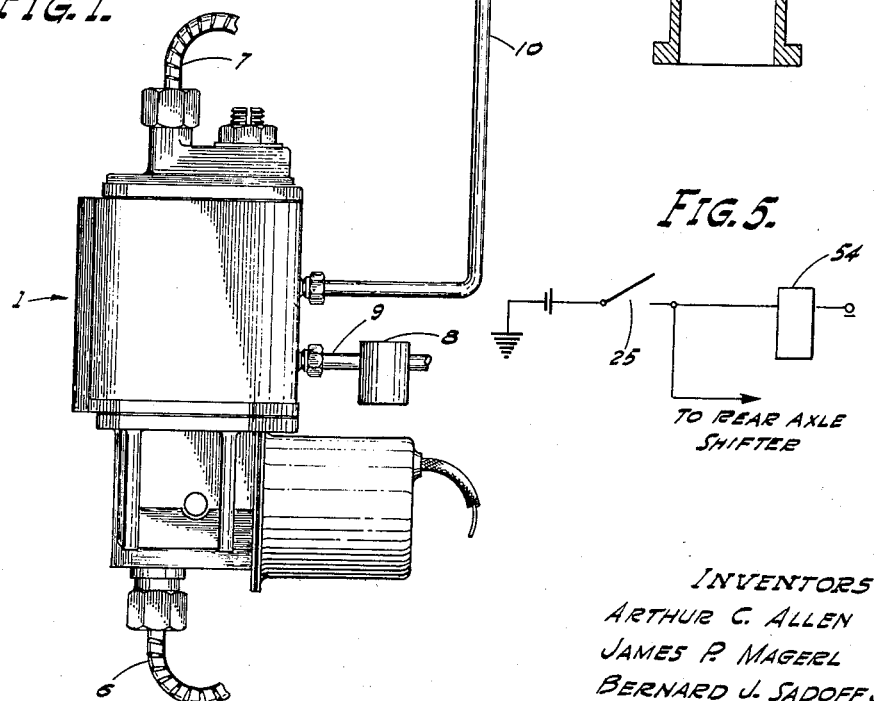
INVENTORS
ARTHUR C. ALLEN
JAMES P. MAGERL
BERNARD J. SADOFF JR.
HARRY P. WERTHEIMER
BY John C Black
ATTORNEY

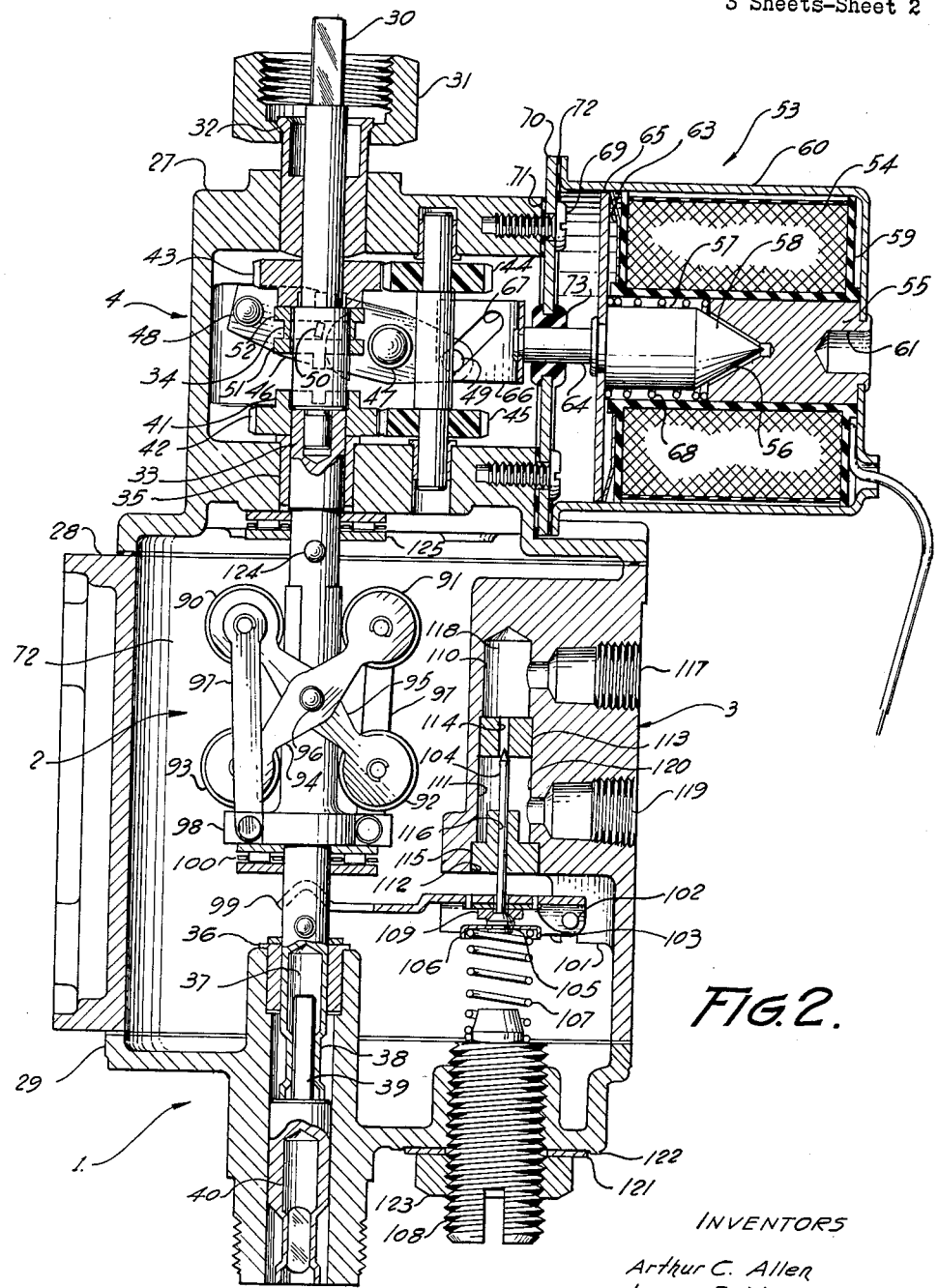

May 14, 1963  A. C. ALLEN ETAL  3,089,501
SPEED GOVERNING SYSTEMS
Filed Oct. 18, 1957  3 Sheets-Sheet 3
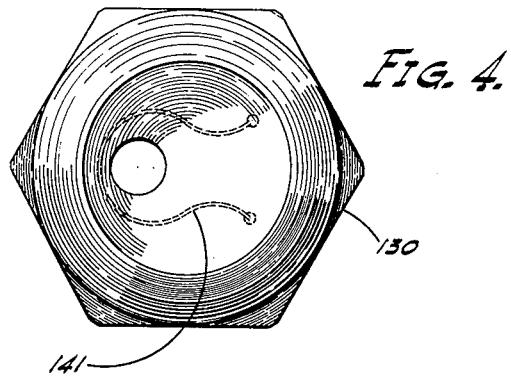
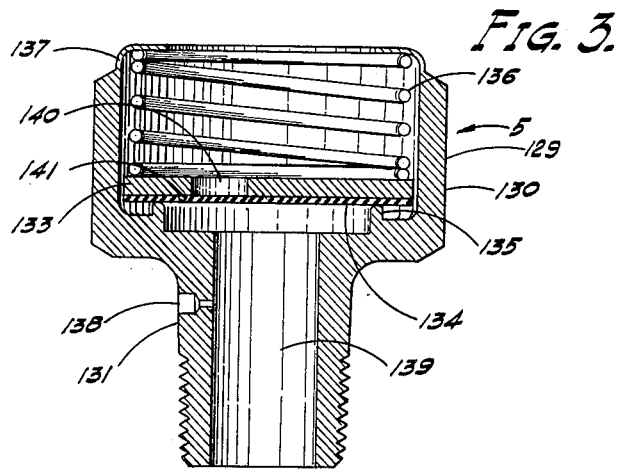
INVENTORS
ARTHUR C. ALLEN
JAMES R. MAGERL
BERNARD J. SADOFF JR.
HARRY P. WERTHEIMER
BY John C. Black
ATTORNEY

United States Patent Office 3,089,501
Patented May 14, 1963

3,089,501
SPEED GOVERNING SYSTEMS
Arthur C. Allen, Chicago, James P. Magerl, Lombard, Bernard J. Sadoff, Jr., Chicago, and Harry P. Wertheimer, Evanston, Ill., assignors to Stewart-Warner Corporation, Chicago, Ill., a corporation of Virginia
Filed Oct. 18, 1957, Ser. No. 690,941
2 Claims. (Cl. 137—53)

This invention relates to speed governors and more particularly to vehicular engine and road speed governors.

The demand for this product arises primarily in the transportation industry. It has been recognized that commercial vehicles traveling in various locations can operate more economically when they are limited to predetermined maximum speeds. By limiting the maximum operating speed of a vehicle, wear on the vehicle is held to a minimum and best fuel economy is obtained. Preventing excessive speeds also assures safer operation of the vehicle.

In the past, heavy duty trucks were generally provided with engines having a relatively low maximum speed. Consequently, an engine speed responsive governor used to limit engine r.p.m. to a specific maximum and dictated by engine wear considerations, simultaneously maintained vehicle road speed within reasonable limits.

However, with the advent of modern high-speed engines, the vehicle is capable of operating at speeds far above those which are safe and economical even when a typical engine speed responsive governor is used. The maximum permissible engine speeds are such in their relation to the transmission gear and axle ratios that the engine governor in the higher gears will not operate to reduce engine speed until the vehicle road speed is far beyond safe and economical limits.

Consequently, it becomes desirable to utilize both an engine speed and a vehicle speed governing device on commercial vehicles in the interest of safety and economy. Most road speed governors developed and used so far have had several failings. Among these are an inability to reliably maintain the exact maximum speed for which they have been preset. Also, certain types of road speed governors are unduly limited with respect to the minimum speed for which they may be set. For example, in one commercially used governor, in which vacuum is the source of operating power, the governor is useful only at high speeds because of the limited amount of engine vacuum available at lower speeds and at full throttle—e.g., 50 m.p.h. and 2000 r.p.m. Other devices have been rough and intermittent in their operation causing the vehicle operator considerable discomfort and fatigue.

We propose to eliminate substantially all limitations to the maximum speed which may be selected and to provide a device which may be reliably preset to a particular speed before the vehicle is released for use on the road with the assurance that the device will consistently and accurately respond to the preset speed. We propose further to provide a vehicle speed governing system compatible with engine speed governing systems presently in use. We propose to provide an improved vehicle speed responsive construction for controlling the application of fluid pressures to an expansible chamber which in turn controls the throttle or injector of the vehicle engine. Its operation is to be distinctively accurate and reliable with a smoothness heretofore unknown for alleviating operator discomfort and fatigue.

The embodiment disclosed herein has been particularly adapted for use on vehicles which are provided with air brake systems, but the invention is not to be limited in all respects thereby. Further, the embodiment disclosed has been combined in a unique and advantageous manner with an engine speed governing device to provide a unitary, exceptionally compatible dual engine and road speed governing system.

Briefly, a diaphragm disposed between two fluid operating chambers is operatively connected to a carburetor butterfly valve. When engine speed is excessive, an engine speed governing device causes a vacuum to be applied to one chamber to cause the diaphragm to urge the throttle butterfly valve toward closed position. If vehicle speed approaches the preset maximum limit, before the engine speed governor setting is reached, a modulating needle valve mechanism controlled by a vehicle speed responsive device applies air pressure in regulated amount to the other chamber. The air may be supplied from an air brake reservoir tank. A restricted vent permits the escape of air from the other chamber to prevent the diaphragm from unduly urging the butterfly valve toward closed position until the preset maximum speed is attained. A vent means also assures accuracy of operation of the engine governing part of the system.

It has been found that the modulating valve and vent in the environment of the disclosed system give a very smooth transition from ungoverned to governed control of the engine at the critical preset maximum road speed such that the operator cannot feel the transition as in other devices.

An improved adjustable lever, speed responsive, fluid valve assembly further assures exceptionally accurate control and smoothness of operation.

In field tests recently conducted under typical operating conditions, a commercial vehicle provided with a governing system incorporating the features of the present invention was run through a series of tests. In the various tests, the road speed governor was set for operation at widely differing high and low speeds. In each instance, the governing system effectively took over complete throttle operation as soon as the vehicle reached the preset speed with the manually operated throttle pedal or accelerator sufficiently depressed to normally maintain the preset speed or a higher speed. The vehicle was maintained continuously at the preset speed regardless of the slope or condition of the road. The operator was unable to detect any change in the speedometer reading as the vehicle moved along a level section of the road, up and down moderate grades.

It can be seen therefore that the governing system will consistently and accurately compensate, within appreciable limits of normal field conditions, for differences in loading due to road conditions and grades. Thus, it can be seen that, when a vehicle is provided with a governing system incorporating the features of the present invention, its operator will be relieved of the necessity for manually adjusting the throttle pedal position to compensate for differing road and grade conditions. Also, the operator need not fear that the preset speed will be exceeded when the vehicle moves down a moderate grade.

Accordingly, it is an object of the present invention to provide a vehicle engine and road speed governing system appreciably more accurate and reliable than previous systems. This object is achieved in large measure by the provision of a unique system utilizing a diaphragm one side of which is utilized for governing engine speed and the other side for governing vehicle speed and utilizing an integral valve and vent means.

It is a further object of the present invention to provide an improved vehicle speed governing system capable of maintaining vehicle speed accurately at a preset speed regardless of road condition and grade.

It is a further object of the present invention to provide an improved, economical, very reliable engine and vehicle speed governing system adapted for manufacture by modern mass production techniques.

It is a further object of the present invention to provide an improved, unique, and compact vehicle speed governing device which is readily adaptable to single and dual speed axle vehicles.

It is a further object of the present invention to provide a vehicle speed governing system adapted for use with existing engine speed governing systems and having an integral safety means preventing damage to the system and faulty operation thereof.

It is a further object of the present invention to provide an improved vehicle speed responsive device compatible with existing speedometer actuating apparaus for both single and dual axle ratio vehicles.

A feature of the present invention is the provision of a speed responsive controlling mechanism having inherently associated therewith a two speed adapter mechanism and being arranged in such fashion as to be adapted for use in existing vehicles having dual speed axles as well as in vehicles with single speed axles.

Another feature of the present invention is the provision of a vehicle speed and engine speed governing system in which the carburetor butterfly valve is controlled by a diaphragm, one side of the diaphragm being connected to manifold vacuum to urge the butterfly valve toward closed position incident to the engine reaching a predetermined speed and the other side of the diaphragm being connected to a source of controlled air pressure to urge the butterfly valve toward closed position incident to the vehicle speed reaching a predetermined maximum.

Another feature of the present invention is the provision of an integral valve and vent arrangement in fluid conducting relationship with that side of the diaphragm connectable to air pressure to prevent erratic operation of the governing system as a result of leakage between the carburetor air passage and the abovesaid side of the diaphragm and to permit the controlled escape of high pressure air when vehicle speed drops below the predetermined maximum.

A further feature of the present invention is the provision of a combination pressure limiting valve with an integral flap valve to prevent excessive air pressures on the system and to assure the presence of atmospheric pressure on the high pressure side of the diaphragm when vehicle speed is below a predetermined maximum.

Other objects and features will be evident upon a perusal of the following disclosure in which:

FIG. 1 is a view diagrammatic in part of the engine and road speed governing system;

FIG. 2 is an elevation view partially in section of the road speed responsive control mechanism;

FIGS. 3 and 4 are respectively elevation and plan views of the valve and vent means;

FIG. 5 shows a two speed adapter operating circuit; and

FIG. 6 is a diagrammatic view of a carburetor.

With particular reference to FIGS. 1 and 6, it can be seen that the proposed engine and road speed governing system comprises a road speed responsive control assembly 1, one side of which is connected in a well known manner to the transmission (not shown) of a vehicle by means of a conventional flexible shaft 6 and the other end of which is connected to a spedometer (not shown) by means of a conventional flexible shaft 7. A source of high pressure air, for example, from an air brake reservoir 8 of a commercial vehicle is connected by conduit 9 to the control assembly 1. When vehicle speed reaches a predetermined maximum, the conduit 9 is connected by way of a valve (to be described later) in the control assembly 1 to the conduit 10 which is in turn connected to a chamber 11 at the lower side of a diaphragm 12. The diaphragm 12 is integrally associated with a conventional carburetor 13.

Carburetor 13 includes a conventional butterfly valve 14 rotatably mounted in its air passageway 24 on an axis transverse to the direction of air flow. A control linkage 15 interconnects the diaphragm 12 and the butterfly valve 14. A chamber 16 above the diaphragm 12 is connected to a source of vacuum, for example, manifold vacuum by way of passageway 19 and conduit 18. The chamber 16 is also connected to atmosphere by way of a conventional engine speed responsive device 17, conduit 20, passageway 21 of the carburetor 13, and an air cleaner 22.

The device 17 may be any one of a number of types well known in the art for closing a valve when engine speed is above a predetermined maximum value. With the valve open, air pressure at the air cleaner 22 is applied to chamber 16. When the valve is closed, manifold vacuum is applied to chamber 16 by way of air passageway of the carburetor 13 and conduit 18. Thus, when the predetermined engine speed is attained, the device 17 operates to cause manifold vacuum to be applied to the chamber 16. The atmospheric pressure in the chamber 11 will then force the diaphragm 12 upwardly. Upward movement of the diaphragm 12 tends to urge the butterfly valve 14 toward its closed position, thereby to prevent excessive engine speed.

A pressure limiting valve assembly 5 is connected to the high pressure air conduit 10 and the chamber 11 by way of a fitting 23 and includes means for preventing excessive air pressures in the chamber 11, for bleeding high pressure air from the chamber 11 when the road speed control assembly 1 is rendered ineffective subsequent to pressurizing chamber 11, and for maintaining chamber 11 at atmospheric pressure when the control assembly 1 is ineffective.

The control assembly 1 includes a two speed adapter 4 (to be described below) which is rendered effective when the governor system is used in commercial vehicles which have axles with two speed ratios. In such vehicles, an electric solenoid (not shown) is provided to control the operation of the vehicle speedometer. For example, a two speed adapter is operatively secured in the speedometer driving means. The adapter is controlled by the solenoid in a manner such that the speedometer is compensated for changes in axle ratios.

Thus the solenoid will open contacts 25 (FIG. 5) when the ratio of the input and output speed of the axle is 1 to 1 and will close the contacts 25 when the ratio is changed. The two speed adapter must have gear ratios similar to the ratio of the axle with which it is used.

The contacts 25 in turn control a solenoid in the two speed adapter of the control assembly 1 to be described below.

With particular reference to FIG. 2, it will be seen that the vehicle speed responsive control assembly 1 comprises a speed sensing mechanism 2, a needle valve mechanism 3 and a two speed adapter 4.

The control assembly 1 is comprised of a three section housing including upper, central and lower sections 27, 28 and 29, respectively. Housing sections 27, 28 and 29 may be of any suitable type such as die-castings. The housing sections are separated by suitable gaskets.

As indicated above, the control assembly 1 is driven by means of a conventional flexible shaft 6 connected to a vehicle transmission. The shaft 6 is connected in a well known manner to a square head shaft 30 by means of a coupler 31.

The shaft 30 is rotatably supported by a bearing 32 and a main shaft 33. A dog clutch 34 is reciprocably held by the shaft 30 and is keyed to the shaft for rotation therewith. The main shaft 33 is rotatably supported by bearings 35 and 36. The lower end of the main shaft 33 has an axial bore 37 and a necked down section 38. The necked down section 38 is pressed inwardly in a well known manner to provide a square aperture adapted to receive the tip 39 of a conventional male flexible shaft connector 40.

The main shaft 33 is connected to the shaft 30 directly when the clutch 34 is moved to its lower position in which position it engages upwardly projecting dogs 41 on a gear 42 rigidly secured to the main shaft 33.

In the upper position of the clutch 34, the main shaft 33 is connected to the shaft 30 by way of the clutch 34, the gears 43, 44, 45 and 42 in a manner well known in the art. Thus, it can be seen that the main shaft 33 can be rotated by the shaft 30 directly or through a speed changing drive depending upon the position of the clutch 34.

The position of the clutch 34 is controlled by a pair of spaced rocker arms 46 which are pivoted on pin 47 on either side of the clutch 34. The outer ends of the rocker arms 46 are connected by pins 48 and 49. The rocker arms 46 each have an inwardly extending projection 50 which rides in an annular groove between a pair of spaced flanges 51 and 52 of the clutch 34. Thus, when the rocker arms 46 are rotated clockwise on the pin 47 to their shown position in FIG. 2, the clutch is moved to its uppermost position; and, when the arms are moved counterclockwise, the clutch is moved to its lowermost position.

The rotational movement of the rocker arms 46 is controlled by an electromagnetic shifting mechanism 53. The mechanism 53 includes a coil 54, a core 55 with a V-shaped conical groove 56 at one end thereof, and a plunger 57 which is generally cylindrical in shape with a conical nose portion 58 matching the conical groove 56. The coil 54 is wound on a form 59 which is pressed into a cup shaped case 60. The core 55 is pressed into the coil form 59. The right hand end of the core 55 has a bore 61. The right hand end of the core 55 is rolled over the case 60 to hold it rigidly in place. A retaining ring 63 is pressed into the case 60 adjacent the left hand edge of the coil form 59 to hold the coil form in place.

The plunger 57 has a narrow cylindrical extension 64 at the left hand side thereof. A flat magnetic disk 65 is pressed on the extension 64 in engagement with the main body portion of the plunger 57.

A generally U-shaped sheet metal wedge element 66 is rigidly secured to the extreme left hand end of the plunger extension 64. Each side of the element 66 has an elongated diagonal groove 67. The pin 49 supported between the right hand ends of the rocker arms 46 rides in the diagonal grooves 67. Thus, when the plunger 57 and the wedge element 66 moves toward the left, the pin 49 is caused to move upwardly, thereby to rotate the rocker arms 46 in a counterclockwise direction. When the plunger 57 and the wedge element 66 are moved toward the right, the pin 49 is caused to move downwardly to rotate the rocker arms 46 in a clockwise direction.

The plunger 57 is mounted for reciprocable movement in an axial direction. A helical compression spring 68 engages the disk 65 to urge the plunger 57 toward the left. Thus, the coil 54 must be energized to move the plunger 57 toward the right against the force of the spring 68. The plunger 57 is shown in the position it takes when the coil 54 is energized.

Thus, it can be seen that when the coil 54 is energized, the plunger 57 is moved toward the right, the rocker arm 46 is moved clockwise and the clutch 34 is moved upwardly to cause the shaft 30 to drive the main shaft 33 by way of the gears 43, 44, 45 and 42.

Alternatively, when the coil 54 is de-energized, the spring 68 moves the plunger 57 to the left to rotate the rocker arms 46 counterclockwise to move the clutch 34 to its lowermost position to cause the shaft 30 to drive the main shaft 33 directly through the gear 42.

The case 60 of the electromagnetic shift mechanism 53 is suitably secured to the right hand side of the upper housing section 27 by means of screws 69. A supporting disk 70 and gaskets 71 and 72 are held between the case 60 and the housing section 27. An annular bearing member 73 is rigidly secured to the central portion of the support disk 70 and reciprocably receives the extension 64 of the plunger 57.

The vehicle speed sensing mechanism 2 is carried by the central portion of the main shaft 33 within the housing section 28, the speed sensing mechanism 2 comprises four weights 90, 91, 92 and 93. The weights 91 and 93 are secured to the outer ends of a pair of spaced sheet metal lever arms 94, and the weights 90 and 92 are secured to the outer ends of a pair of lever arms 95 which are disposed substantially perpendicular to the lever arms 94. The pairs of lever arms 94 and 95 are pivotally secured at their central portions to the main shaft 33 by means of a cross-pin 96.

A pair of spaced operator arms 97 are pivotally secured to the ends of the lever arms 95 to which the weight 90 is secured. The arms 97 are pivotally secured at their opposite ends to a collar 98 reciprocably supported by the main shaft 33. The collar 98 is keyed to the shaft 33 for rotation therewith. When the weights 90—93 move away from the shaft 33, the arms 97 moved downwardly to move the collar and a valve actuating lever 99. A conventional roller thrust bearing 100 is held on the shaft 33 between the collar 98 and the lever 99. Thus, as the weights 90—93 move outwardly in response to higher vehicle speeds the collar 98 and the thrust bearing 100 move downwardly with respect to FIG. 2.

The valve actuating lever 99 is pivotally secured to a boss 101 in the housing section 28 by means of a pivot pin 102. When the collar 98 and the thrust bearing 100 move downwardly in response to higher vehicle speeds, the thrust bearing 100 urges the lever 99 downwardly in a counterclockwise direction with respect to FIG. 2.

A third nylon strip 103 is suitably secured to the lower surface of the lever 99. An elongated valve stem 104 having an enlarged and generally hemispherical head 105 at its lower end is inserted in an aperture in the lever 99 and extends upwardly therethrough. A cup-shaped disk 106 is secured rigidly to the lower end of the valve stem 104. A helical biasing spring 107 is retained at one end by the disk 106 and abuts at its other end an adjusting screw 108 threaded into the lower housing section 29. The spring 107 urges the disk 106 and the valve stem 104 upwardly against the lever 99. A generally disk-like bronze washer bearing 109 is held between the nylon strip 103 and the head 105 of the valve stem. The bearing 109 has a generally hemispherical central recess for pivotally receiving the valve stem head 105. The upper flat surface of the bearing 109 can slide freely on the nylon strip 103. This construction provides extremely fine accuracy of adjustment, coupled with simplicity of design and minimized frictional forces.

When the centrifugal force of the weights 90—93 urges the lever 99 counterlockwise in response to increasing vehicle speed as described above, the lever 99 is moved to a position in which the centrifugal force is equal and opposite to the biasing force of the spring 107 which is compressed upon counterclockwise rotation of the lever 99. Thus, it can be seen that the distance the lever 99 will move in response to a predetermined centrifugal force acting on the weights 90—93 is determined by the preloading of the biasing spring 107 by the adjusting screw 108.

The boss 101 is considerably enlarged immediately above the position of the lever 99. The enlarged portion of the boss 101 is provided with a vertical bore 110 and counterbores 111 and 112. A plug 113 pressed into the counterbore 111 includes a bore 114. A second plug 115 having a bore 116 is pressed into the counterbore 112. The valve stem 104 is reciprocably received in the bore 116 of the plug 115 and extends therethrough to seat itself in the bore 114 of the plug 113. Thus it can be seen that when centrifugal force due to vehicle speed moves the weights 90—93 away from the shaft 33 in response to increasing vehicle speed to move the lever 99 counterclockwise, the valve stem 104 is moved downwardly by the lever 99 to unseat itself from the bore 114.

A fluid inlet passageway 117 is provided in the boss 101 and connects with the chamber 118 defined by the bore 110. A fluid outlet passageway 119 is provided in the boss 101 and connects with a chamber 120 defined by the counterbore 111 and the lower and upper surfaces respectively of the plugs 113 and 115. Thus it can be seen that when the valve stem 104 unseats itself from the bore 114 of the plug 113 as described above, the inlet 117 and the outlet 119 are connected in fluid conducting relation with a degree of restriction dependent upon the distance the valve stem 104 moves from its seat.

When the adjusting screw 108 is rotated to adjust the spring 107 for a predetermined vehicle speed, it rotates a flat washer 121 which is keyed to the screw 108. The washer 121 includes a scribed line (not shown) which cooperates with an annular scale 122 secured to the lower edge of the housing section 29 concentric with the screw 108. A lock nut 123 prevents a change in adjustment due to vibration.

A pin 124 and a thrust bearing 125 take up the upwardly directed thrust reaction from the speed sensing mechanism 2.

The valve assembly 5 will now be described in detail. The assembly 5 (FIGS. 3 and 4) includes a body 129 which has a generally cup shaped upper portion 130 of hexagonal cross-section and a necked down lower cylindrical portion 131. The valve assembly 5 is threaded at its lower end for securing it to a fitting 23 (FIG. 1) which connects the air pressure conduit 10 to the chamber 11. A disk-like pressure relieve valve 133 (FIG. 3) of a suitable material such as Bakelite and a matching rubber flapper valve 134 are seated on an annular projection 135 on the base of the cup like portion 130. A helical spring 136 applies a predetermined biasing force to the upper surface of the valve 133. A necked down upper edge 137 of the cup like portion 130 is rolled inwardly to retain the spring 136 in place. A minute bore 138 in the body portion 131 vents the passageway 139 to atmosphere. The passageway 139 is connected in fluid conducting relationship with the high pressure conduit 10 (FIG. 1) and the chamber 11.

The combination of the valve 133 (FIG. 3) and the flapper valve 134 provides the means for preventing excessive pressures in the chamber 11 (FIG. 1) when the control assembly 1 opens a valve therein to extend high pressure air from the reservoir 8 to the chamber 11 by way of the conduits 9 and 10. More specifically, when the pressure in the chamber 11 and the conduit 10 rises above a value predetermined by the force of spring 136 (FIG. 3), air pressure will raise the valves 133 and 134 off of the seat 135 to vent the conduit 10 and chamber 11 to atmosphere. When the pressure in chamber 11 and conduit 10 lowers to the predetermined value, the valves 133 and 134 will again be seated on the seat 135. Whenever conduit 10 and chamber 11 are subjected to high pressure air, some of the air will bleed through the restricted exhaust bore 138; however, this will not be large enough to affect the pressure in the chamber 11.

When the vehicle speed is below the speed for which the control assembly 1 is preset, communication between the conduits 9 and 10 is broken and and the air under pressure in conduit 10 and chamber 11 will bleed through the bore 138 until atmospheric pressure is attained.

Whenever a linkage such as 15 is connected to the shaft of a butterfly valve such as 14 to control the rotational position of the butterfly valve, leakage around the butterfly valve shaft is inevitably experienced after a comparatively short use. Consequently, it is inevitable that leakage between the chamber 11 and the air passageway 24 of the carburetor 13 will result. Consequently, the vacuum in the passageway 24 will have a tendency to cause a vacuum in the chamber 11. If this were not compensated or corrected, an error would be introduced into that portion of the system which governs the engine speed. More particularly, if a vacuum were created in the chamber 11, then it would substantially counterbalance the vacuum created in the chamber 16 when the maximum permissible engine speed is exceeded and the diaphragm 12 could not move upwardly to urge the butterfly valve 14 towards closed position.

In order to prevent a vacuum from being created in the chamber 11, the valve assembly 5 provides means (in addition to the vent 138) for opening the chamber 11 to atmosphere whenever the pressure falls below atmospheric pressure. More particularly, the restricted bore 138 will maintain the chamber 11 at atmospheric pressure for very small leaks around the shaft of the butterfly valve 14. When the leakage is greater to such an extent that the pressure in chamber 11 begins to fall below atmospheric pressure, then atmospheric pressure acting on the flapper valve 134 by way of an aperture 140 in the valve 133 forces the flapper valve 134 downwardly at its central portion. As the central portion of the flapper valve 134 moves downwardly an aperture 141 therein is uncovered and air under atmospheric pressure will flow into the conduit 10 and the chamber 11 to maintain the chamber 11 at atmospheric pressure.

A more detailed description of the operation of the road speed governing portion of the system will now be described in detail. As indicated previously, the shaft 30 of the speed governing assembly 1 is operatively connected to the transmission of the vehicle. Depending at any instant in time upon which axle ratio is being used, the shaft 30 will rotate the main shaft 33 in accordance with vehicle speed directly or through the speed reducing gear assembly.

The centrifugal weights 90—93 will be urged outwardly away from the shaft 33 an amount in proportion to the instantaneous speed of the shaft 33. The force acting on the weights 90—93 acts on the operating arms 97 to urge the collar 98, the thrust bearing 100, and the lever 99 downwardly with respect to FIG. 2 against the force of the biasing spring 107. The force of the spring 107 will have been predetermined by the setting of the adjustable screw 108 which is preset for a predetermined vehicle speed.

It will be noted that the thrust bearing 100 does not occupy all of the axial space between the lever arm 99 and the collar 98 in the normal at rest position of the centrifugal device 2. This will assure a positive seating of the valve stem 104 on its seat in the plug 113 at low vehicle speeds. Consequently, the initial movement of the centrifugal weights 90—93, the arms 97 and the collar 98, will not be restrained by the force of the spring 107. After engagement of the arm 99, the thrust bearing 100 and the collar 98 at some predetermined low speed, further movement of the centrifugal device 2 will be in opposition to the force of the spring 107.

It is preferred that the device be positioned with the shafts 30 and 33 in a generally horizontal position for minimizing the effect of excessive road shocks on the centrifugal device 2; however, the device still operates very well in other positions of the shaft.

As indicated above, the force of the spring 107 at any setting will, under compression in an open position of the valve assembly 3, be opposed by an equal and opposite force from the centrifugal device 2. Consequently, it will be appreciated that, as the speed of the vehicle begins to approach the preset speed, the force of the centrifugal device 2 will gradually move the arm 99 counterclockwise with respect to FIG. 2 to compress the spring 107 and to slightly open the valve assembly 3 between the inlet passageway 117 and the outlet passageway 119. As the vehicle gets closer and closer to the preset speed the valve assembly 3 will be opened further and further to increase fluid flow from the inlet passageway 117 to the outlet passageway 119. When the preset speed is reached, the valve assembly 3 will be sufficiently opened to cause the governor system to effectively prevent higher vehicle speed.

With particular reference to FIG. 1, it will be remembered that the high pressure air reservoir 8 is connected by way of the conduit 9, the valve assembly 3 of the speed responsive assembly 1, the conduit 10, and the fitting 23 to the chamber 11 below the diaphragm 12. Consequently, as the valve assembly 3 is gradually opened as described above incident to vehicle speed approaching the preset speed, air under pressure from the reservoir 8 will flow into the chamber 11 tending to urge the diaphragm 12 upwardly. Upward movement of the diaphragm 12 causes corresponding movement of the butterfly valve 14 toward closed position to restrict the passage of air and fuel to the manifold.

A manually operated accelerator pedal (not shown) may be connected in a well known manner through a friction drive assembly (not shown) to the linkage 15 or the shaft of the butterfly valve 14. When the diaphragm 12 moves upwardly in response to the full open position of the valve assembly 3 at the preset vehicle speed in the manner indicated above to urge the butterfly valve 14 toward relatively closed position, the operator loses control of vehicle speed; and further depression of the accelerator pedal will not affect the throttle.

As soon as the operator permits the accelerator pedal to raise to a position in which the butterfly valve 14 will be closed further than it is closed by the operation of diaphragm 12 at the preset speed, the vehicle will decelerate to a speed below the preset speed. Then the centrifugal mechanism 2 will close the valve assembly 3. Air pressure in the chamber 11 will be vented in a very short time to atmosphere through the restricted bore 138, the diaphragm 12 will return to its normal position, and the operator will regain complete control of the butterfly valve 14.

If the air pressure in the chamber 11 rises above a predetermined maximum, for example 10 p.s.i., consequent to its connection with the reservoir 8, then the valve elements 133 and 134 (FIG. 3) will raise off the seat 135 against the force of spring 136 to maintain the pressure in chamber 11 at the predetermined maximum.

When leakage around the pivot shaft of the butterfly valve 14 causes subatmospheric pressure in the chamber 11, the chamber 11 is vented to atmosphere by way of the vent hole 138 (FIG. 3) and the ports 140 and 141.

While there has been described what is at present to be believed the preferred embodiment of the invention, it will be understood that various changes and modifications may be made therein; and it is contemplated to cover in the appended claims all such changes and modifications as fall within the true spirit and scope of the invention.

What is claimed is:

1. A speed responsive device comprising: a body, a shaft rotatably supported by the body, a centrifugal speed responsive mechanism secured to the shaft, a collar keyed concentrically to the shaft for rotation therewith and adapted for relative coaxial movement thereon, linkage interconnecting the centrifugal device and the collar for moving the collar axially relative to the shaft, a lever arm pivoted on an axis generally perpendicular to the axis of the shaft with its free end extending to a position adjacent the shaft, a thrust bearing interposed between the collar and lever arm for moving the lever arm on its pivot incident to axial movement of the collar, a valve stem supported by the lever arm and having a generally hemispherical head, structure on the lever arm including a generally hemispherical seating surface for pivotally supporting the valve stem, an adjustable helical biasing spring axially aligned with the valve stem urging the valve stem toward its seating surface on the lever arm, fluid inlet and outlet passageways in the device, and a valve seat structure interposed between the passageways and cooperating with the valve stem for interconnecting the inlet and outlet passageways in response to shaft speeds above a predetermined level.

2. A responsive device comprising: a body, a shaft rotatably supported by the body, a centrifugal speed responsive mechanism secured to the shaft, a collar keyed concentrically to the shaft for rotation therewith and adapted for relative coaxial movement thereon, linkage interconnecting the centrifugal device and the collar for moving the collar axially relative to the shaft, a lever arm pivoted on an axis generally perpendicular to the axis of the shaft with its free end extending to a position adjacent the shaft, a thrust bearing interposed between the collar and the lever arm for moving the lever arm on its pivot incident to axial movement of the collar, a valve stem supported by the lever arm and having a generally hemispherical head, a nylon strip rigidly secured to the lever arm, a helical biasing spring axially aligned with the valve stem urging the valve stem toward the lever arm and nylon strip, a bearing element loosely interposed between the nylon strip and the head of the valve stem and having a bore and generally hemispherical recess for pivotally receiving the valve stem head, structure defining fluid inlet and outlet passageways in the device, and a valve seat structure interposed between the passageways and cooperating with a valve stem for interconnecting the inlet and the outlet passageways in response to shaft speeds above a predetermined level.

References Cited in the file of this patent

UNITED STATES PATENTS

| | | |
|---|---|---|
| 979,907 | White | Dec. 27, 1910 |
| 997,232 | Bowers | July 4, 1911 |
| 1,082,225 | Deardorff | Dec. 23, 1913 |
| 1,128,115 | Douglas | Feb. 9, 1915 |
| 1,676,902 | Jones | July 10, 1928 |
| 1,712,819 | Freedman | May 14, 1929 |
| 2,003,857 | Hale | June 4, 1935 |
| 2,142,403 | McCullough | Jan. 3, 1939 |
| 2,157,472 | Bellis | May 9, 1939 |
| 2,253,875 | Vatter | Aug. 26, 1941 |
| 2,334,720 | Marsh | Nov. 23, 1943 |
| 2,346,681 | Harper | Apr. 18, 1944 |
| 2,365,732 | Snoro | Dec. 26, 1944 |
| 2,377,256 | Mallory | May 29, 1945 |
| 2,458,424 | Reynoldson | Jan. 4, 1949 |
| 2,657,918 | Parker | Nov. 3, 1953 |
| 2,708,979 | Reynoldson | May 24, 1955 |
| 2,719,517 | Adler | Oct. 4, 1955 |

FOREIGN PATENTS

| | | |
|---|---|---|
| 442,638 | Great Britain | Feb. 12, 1936 |
| 480,714 | Great Britain | Feb. 28, 1938 |